Patented Feb. 27, 1940

2,191,801

UNITED STATES PATENT OFFICE 2,191,801

POLYAZO DYE COMPOUNDS

Arthur R. Murphy, deceased, late of Penns Grove, N. J., by Margaret R. Murphy, administratrix, Penns Grove, N. J., and Swanie S. Rossander, Wilmington, Del., assignors to E. I. du Pont de Nemours & Company, Wilmington, Del., a corporation of Delaware No Drawing. Application August 26, 1937,
Serial No. 161,038

11 Claims. (Cl. 8—46)

This invention relates to polyazo dyes and especially to such dyes which are substantive to cotton, regenerated cellulose and similar materials and are developed on the fibre by diazotizing and coupling with azo dye coupling components; to fabrics dyed with the dye and to processes of making the dyes and dyeings.

It is among the objects of the invention to provide dyeings on cotton, regenerated cellulose and similar materials which have excellent fastness to washing. Another object of the invention is to provide developed dyes on said materials from a class of polyazo dyestuffs having a plurality of diazotizable amino groups which hereinafter will be more particularly described. Another object of the invention is to provide processes of making the dyes. Another object of the invention is to provide fabrics dyed with the dyes and processes therefor. Still other objects of the invention will be apparent from the following description of the invention.

The objects of the invention are attained generally by dyeing the material to be dyed with the polyazo dye referred to, diazotizing the dye on the fibre and then developing by coupling with an azo dye coupling component which is devoid of solubilizing groups, such as carboxy and sulfonic acid.

The polyazo dyestuff referred to is represented generally by the formula:

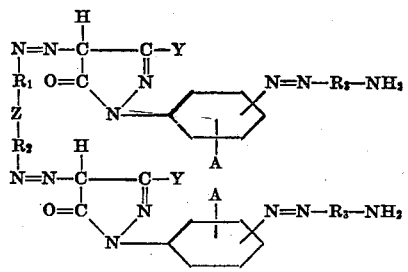

in which —$R_1$—Z—$R_2$—has two aryl groups, $R_1$ and $R_2$ which are joined directly or by an intervening group —Z— which may consist of any of the groups

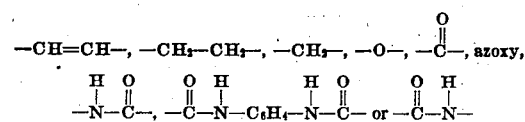

and $R_1$ and $R_2$ are substituted or unsubstituted benzene or naphthalene nuclei; A is at least one of the group consisting of hydrogen, alkyl, alkoxy, halogen, sulfonic acid and carboxyl; Y represents alkyl or carboxyl; and $R_3$ is the aryl nucleus of an azo dye coupling component substituted by a diazotizable amino group.

The group —$R_1$—Z—$R_2$— is a di-amino-aryl compound having two aryl nuclei. $R_1$ and $R_2$ are like or unlike benzene or naphthalene nuclei which may be unsubstituted or substituted once or more than once by alkyl, alkoxy, sulfonic acid, carboxyl or halogen, such as chloro, bromo, methyl, ethyl, propyl, butyl, the corresponding alkoxy groups and still others. The amino groups must be present in different aryl nuclei and be capable of diazotization, either concurrently or consecutively in order to produce a tetrazo compound. The two aryl nuclei may be directly united, such as di-amino derivatives of diphenyl or they may be united by intermediate groups. The following are illustrations of compounds which can be used instead of diphenyl compounds and the intermediate groups are given.

| | |
|---|---|
| 4:4'-di-amino-stilbene | —CH=CH— |
| 4:4'-di-amino-di-benzyl | —CH$_2$—CH$_2$— |
| 4:4'-di-amino-diphenyl methane | —CH$_2$— |
| 4:4'-di-amino-diphenyl ether | —O— |
| 4:4'-diamino-benzophenone | —C(=O)— |
| 3:3'-di-amino-azoxy-benzene | azoxy |
| m-Amino-benzoyl-m-phenylene diamine | —N(H)—C(=O)— |
| 1:3-di(amino-benzoyl-amino)-benzene | —C(=O)—N(H)—C$_6$H$_4$—N(H)—C(=O)— |
| 4-amino-naphthoyl-m-phenylene diamine | —C(=O)—N(H)— |

The pyrazolone group is a 1-(amino-phenyl) 5-pyrazolone compound which in the benzene nucleus may be unsubstituted or substituted by alkyl, alkoxy, halogen sulfonic acid or carboxyl. The amino group is preferably in the 3-position of the aryl nucleus and the pyrazolone ring may be additionally substituted by methyl or carboxyl in the 3-position thereof.

The end component of the dyestuff is any azo dye coupling component having a diazotizable amino group, such as amino benzenes, naphthylamines, hydroxy substituted amino-benzenes and naphthylamines and amino-substituted phenylpyrazolones. The aryl nuclei of these compounds may be unsubstituted or they may be substituted once or more than once by alkyl, alkoxy, halogen, hydroxy, sulfonic acid and carboxyl. In coupling some unsubstituted compounds, such as aniline it is necessary to use the omega sulfonic acid derivative as the parent substance and then hydrolyze after coupling to produce the diazotizable amino group. Otherwise the parent substances described can generally be directly coupled. For economically producing dyestuffs having generally good properties the compounds of benzene and naphthalene are preferred, but others can be used with good results.

Among the preferred compounds to be coupled as the end components are 1-naphthylamine-6-sulfonic acid, 1-naphthylamine-7-sulfonic acid and mixtures of these compounds.

The products containing 2 to 4 solubilizing groups, such as sulfonic acid and carboxyl have the most desired solubility. Products containing two sulfonic acid groups and two carboxyl groups are preferred. The carboxyl groups are preferably substituted in the pyrazolone ring and the sulfonic acid groups are present in the end components.

In the preferred embodiments the aryl nuclei of the middle di-aryl-diamine are substituted or unsubstituted benzene nuclei with an intervening azoxy or —NHCO—group, the pyrazolone ring is substituted by carboxy and the end groups are naphthylamines substituted by sulfonic acid in the 6 or 7 positions with respect to the amino groups.

The polyazo dyestuffs may be made by tetrazotizing one mole of a compound represented by the formula $NH_2—R_1—Z—R_2—NH_2$, such as para-amino-benzoyl-meta-phenylene-diamine, coupling in strong alkaline medium with two moles of the pyrazolone compound, such as 1-meta-amino-phenyl-5-pyrazolone-3-carboxylic acid, salting and separating the product of coupling from the reaction mixture. The product of coupling is tetrazotized and coupled with two moles of the aryl-amine end group, such as 1-naphthalene-6-sulfonic acid in a medium which is made gradually alkaline. The polyazo dyestuff is then salted out filtered and dried. The product is soluble in water, substantive to cotton, regenerated cellulose fibres and similar materials and is capable of being tetrazotized.

The invention is illustrated by the following examples but it is to be understood that the invention is not limited thereto.

Example I

Five parts of cotton piece goods were dyed in a solution containing two hundredths parts of the dyestuff made by coupling one mole of diazotized 3-3'-diamino-azoxy-benzene with two mols of 1-meta-amino-phenyl-5-pyrazolone-3-carboxylic acid, and then diazotizing the product of coupling and coupling to two mols of 1:6-Cleve's acid.

The dyed fabric was rinsed in cold water and put in 200 parts of water at 20° C. Three tenths parts of sodium nitrite and four tenths parts of sulfuric acid were added and the mixture was stirred 15 minutes. The fabric was rinsed in cold water and immersed in a rapidly stirred solution which was made by dissolving one tenth part of beta naphthol and one twentieth part of caustic soda in 200 parts of water. The solution was rapidly stirred for 15 minutes and the fabric was rinsed in cold water and dried. The dyeing was a brown shade having exceptional fastness to washing, good discharge properties and good fastness properties to other exposures ordinarily encountered by dyed fabrics. The probable formula of the dye on the fiber is:

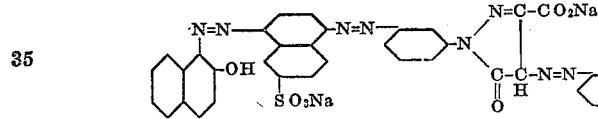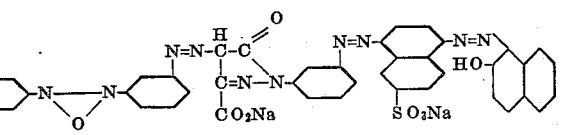

A fabric composed of regenerated cellulose was dyed with the same dye and by similar method giving excellent results.

In the following examples cotton and regenerated cellulose piece goods were dyed by processes similar to Example I using the dyestuffs indicated. In these examples coupling is indicated by arrows which point from the compound or azo compound which is diazotized toward the compound which is coupled thereto. A subscript, 2 indicates that two mols of the compound is involved in the coupling. The dyestuffs are indicated by the names of the parent substances used in their preparation.

| | Diazo component | Coupling component | Shade on cotton and regenerated cellulose |
|---|---|---|---|
| II | 3:3'-Diamino azoxy benzene → (1-meta amino phenyl-5-pyrazolone-3-carboxylic acid)₂ → (1:6 Cleve's acid)₂. | 1-phenyl-3-methyl-5-pyrazolone | Red brown. |
| III | ----do---- | Aceto acetanilide | Yellow brown. |
| IV | ----do---- | Meta tolylene diamine | Olive brown. |
| V | Para amino benzoyl meta phenylene diamine → (1-meta amino phenyl-5-pyrazolone-3-carboxylic acid)₂ → (Mixed Cleve's acid)₂. | Beta naphthol | Brown. |
| VI | Para amino benzoyl-meta phenylene diamine → (1-meta amino phenyl-5-pyrazolone-3-carboxylic acid)₂ → (J-acid)₂. | ----do---- | Red brown. |
| VII | Para amino benzoyl-meta phenylene diamine → (1-meta amino phenyl-5-pyrazolone-3-carboxylic acid)₂ → (p-amino benzoyl J-acid)₂. | ----do---- | Orange. |
| VIII | Para amino benzoyl-meta phenylene diamine → (1-meta amino phenyl-5-pyrazolone-3-carboxylic acid)₂ → (1-meta amino phenyl-5-pyrazolone-3-carboxylic acid)₂. | ----do---- | Do. |
| IX | ----do---- | 1-phenyl-3-methyl-5-pyrazolone | Yellow. |

| | Diazo component | Coupling component | Shade on cotton and regenerated cellulose |
|---|---|---|---|
| X | Benzidine-3:3'-disulfonic acid ⇌ (1-meta amino phenyl-3-methyl-5-pyrazolone)₂ ⇌ (1-meta amino phenyl-3-methyl-5-pyrazolone)₂. | 1-phenyl-3-methyl-5-pyrazolone | Yellow. |
| XI | ....do.... | Beta naphthol | Orange. |
| XII | Benzidine-3:3'-disulfonic acid ⇌ (1-meta amino phenyl-3-methyl-5-pyrazolone)₂ ⇌ (1-meta amino phenyl-5-pyrazolone-3-carboxylic acid)₂. | 1-phenyl-3-methyl-5-pyrazolone | Yellow. |
| XIII | ....do.... | Beta naphthol | Orange. |
| XIV | Benzidine-3:3'-disulfonic acid ⇌ (1-meta amino phenyl-3-methyl-5-pyrazolone)₂ ⇌ (Cresidine)₂. | ....do.... | Red. |
| XV | Benzidine-3:3'-disulfonic acid ⇌ (1-meta amino phenyl-3-methyl-5-pyrazolone)₂ ⇌ (J-acid)₂. | ....do.... | Do. |
| XVI | Benzidine-3:3'-disulfonic acid)₂ ⇌ (1-meta amino phenyl-3-methyl-5-pyrazolone)₂ ⇌ (P. A. B. -J-acid)₂. | ....do.... | Orange. |

The dyeings of Examples II to XVI had properties similar to the properties of Example I except as indicated.

The products of the invention can be produced in substance and used for pigments and the like, but for dyeing fabrics they are produced on the fabric in which form the dyeings have outstanding fastness to washing.

The dyes are developed by coupling with azo dye coupling components which are devoid of solubilizing groups, such as carboxy and sulfonic acid groups. The hydroxy compounds of the benzene and naphthalene series, amino-benzene compounds, naphthylamine compounds, hydroxy-amino-benzene compounds, amino-naphthols, N-substituted derivatives of amino-naphthols, aryl-pyrazolone compounds and aceto-acetanilide compounds which are free from solubilizing groups may be used for coupling components. Beta-naphthol, 1-phenyl-3-methyl-5-pyrazolone, aceto-acetanilide and meta-tolylene-diamine are mentioned as illustrations of developing agents but many others can be used. Beta-naphthol and 1-phenyl-3-methyl-5-pyrazolone produce developed dyeings of generally excellent properties and they are preferred as coupling components.

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

It is claimed:

1. The compounds represented by the formula

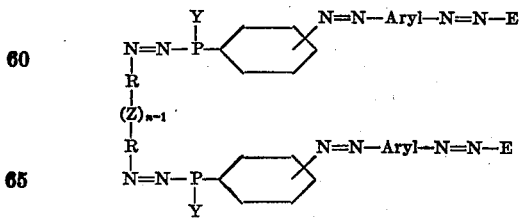

in which —R—(Z)$_{n-1}$—R— is the radical of a diamine of the diphenyl series wherein Z is one of a group consisting of

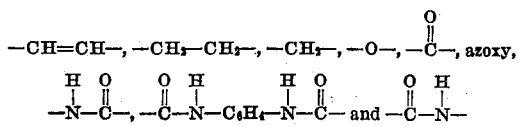

and $n$ is an integer not greater than 2;

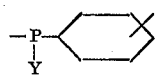

is the radical of a 1-(amino phenyl)-5-pyrazolone wherein Y is in the 3-position of the pyrazolone nucleus and is one of a group consisting of methyl and carboxyl; each Aryl is the radical of one of a group consisting of Cleves acid, J-acid, aminobenzoyl-J-acid, 1-(amino phenyl)-5-pyrazolones having in the 3-position one of a group consisting of methyl and carboxyl, aniline and alkyl and alkoxy derivatives of aniline; and each E is the radical of one of a group consisting of beta naphthol and 1-phenyl-3-methyl-5-pyrazolone; said compound having at least two solubilizing groups as substituents of the radicals R, P and Aryl.

2. A compound represented by the formula

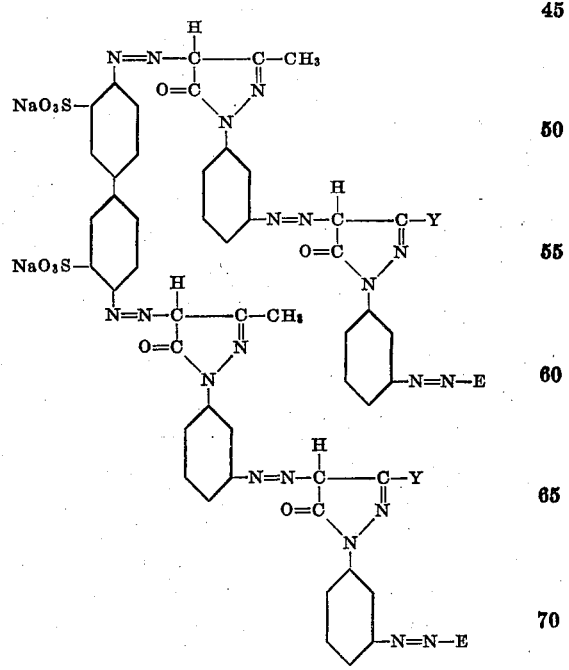

in which Y is one of the group consisting of methyl and —COONa and E is the residue after coupling of one of the group consisting of beta-naphthol and 1-phenyl-3-methyl-5-pyrazolone.

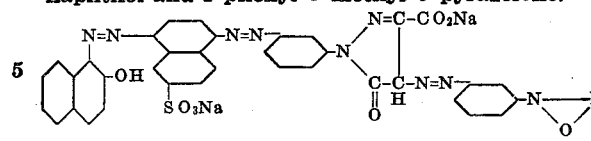

3. A compound represented by the formula

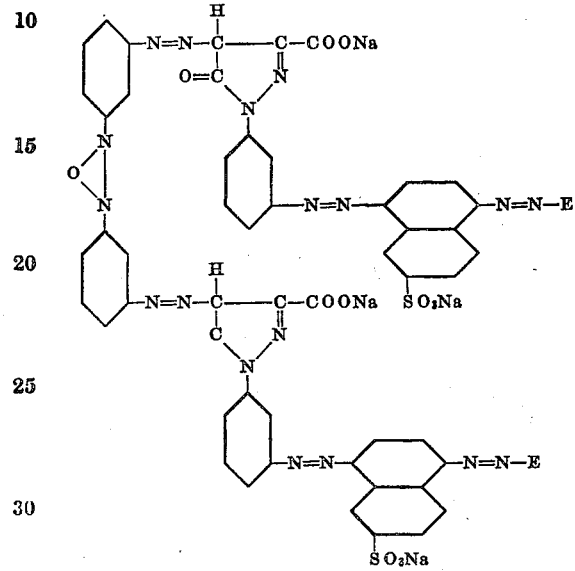

in which E is the residue after coupling of one of the group consisting of beta-naphthol and 1-phenyl-3-methyl-5-pyrazolone.

4. A compound represented by the formula

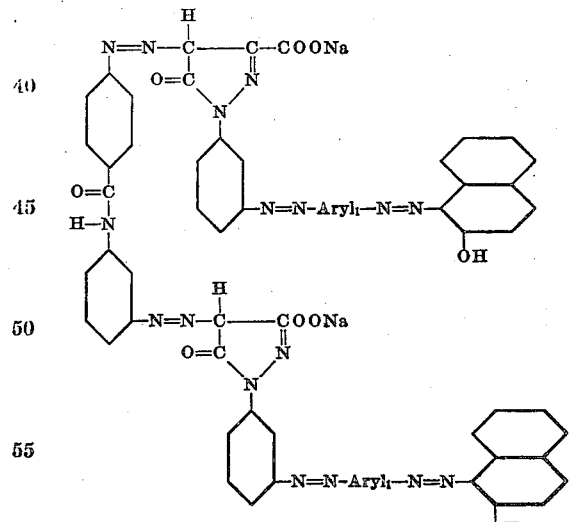

in which Aryl₁ is the residue of one of the group consisting of the sodium salts of a Cleve's acid, J-acid, amino-benzoyl-J-acid-1-(amino phenyl)-5-pyrazolones having in the 3-position one of the group consisting of methyl and carboxyl, aniline and alkyl and alkoxy derivatives of aniline.

5. Cellulosic textile fabric dyed with the dye of claim 1.

6. Cellulosic textile fabric dyed with the dye of claim 2.

7. Cellulosic textile fabric dyed with the dye of claim 3.

8. Cellulosic textile fabric dyed with the dye of claim 4.

9. Cellulosic textile fabric dyed with the dye of claim 10.

10. The compound represented by the formula

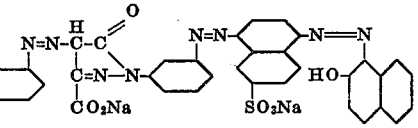

11. The process which comprises dyeing fibres from the group consisting of cellulose fibres and fibres of regenerated cellulose with a compound represented by the formula

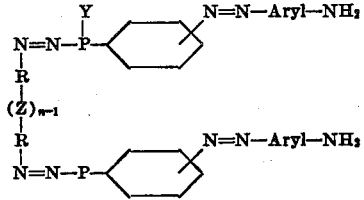

in which —R—(Z)$_{n-1}$—R— is the radical of a diamine of the diphenyl series wherein Z is one of a group consisting of

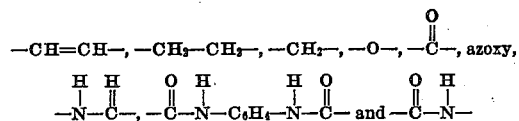

and $n$ is an integer not greater than 2;

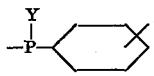

is the radical of a 1-(amino phenyl)-5-pyrazolone wherein Y is in the 3-position of the pyrazolone radical and is one of a group consisting of methyl and carboxyl and each Aryl is the radical of one of a group consisting of Cleve's acid, J-acid, amino-benzoyl-J-acid, 1-(amino- phenyl)-5-pyrazolones having in the 3-position one of a group consisting of methyl and carboxyl; said compound having at least two solubilizing groups present as substituents of the radicals R, P and Aryl; diazotizing the dye on the fiber and treating with a solution of an azo dye coupling component which is devoid of solubilizing groups, said coupling component being one of a class consisting of beta naphthol and 1-phenyl-3-methyl-5-pyrazolone.

MARGARET R. MURPHY,
Administratrix of the Estate of Arthur R. Murphy, Deceased.
SWANIE S. ROSSANDER.